United States Patent [19]

Gluys et al.

[11] Patent Number: 5,566,983
[45] Date of Patent: Oct. 22, 1996

[54] FLUID INTERFACE

[75] Inventors: James D. Gluys, Portage; William R. Chene, Kalamazoo, both of Mich.

[73] Assignee: Eaton Corporation, Cleveland, Ohio

[21] Appl. No.: 517,513

[22] Filed: Aug. 21, 1995

[51] Int. Cl.$^6$ ................................................ F16L 55/00
[52] U.S. Cl. ........................... 285/14; 285/93; 277/2
[58] Field of Search ............................ 285/13, 14, 93; 277/2

[56] References Cited

U.S. PATENT DOCUMENTS

| Re. 34,260 | 5/1993 | Markyvech | 74/335 |
|---|---|---|---|
| 2,906,548 | 9/1959 | Fallow | 285/14 |
| 4,046,387 | 9/1977 | Lee | 285/93 X |
| 4,678,017 | 7/1987 | Schultz | 152/416 |
| 4,817,994 | 4/1989 | Bronnert | 285/93 |
| 4,865,356 | 9/1989 | Moore et al. | 285/93 X |
| 4,877,048 | 10/1989 | Oltean | 137/225 |
| 5,222,404 | 6/1993 | Stine | 74/335 |
| 5,231,895 | 8/1993 | Stine | 74/745 |
| 5,240,291 | 8/1993 | Zornow | 285/93 X |

FOREIGN PATENT DOCUMENTS

| 2638811 | 5/1990 | France | 285/93 |
|---|---|---|---|
| 496085 | 7/1955 | Italy | 285/14 |
| 1181155 | 2/1970 | United Kingdom | 285/93 |

*Primary Examiner*—Dave W. Arola
*Attorney, Agent, or Firm*—Howard D. Gordon

[57] ABSTRACT

A fluid interface between fluid conduits (14, 56) defined in two members (12, 52) attached in surface (20)-to-surface (58) contact with an O-ring seal (64) resiliently received in a counterbore cavity (62) is provided. A test passage (54) is provided from the cavity to the exterior, which will be blocked by the seal and will allow limited fluid from the cavity to the exterior in the absence of the seal whereby the presence or absence of fluid flow through the test passage is indicative of the absence or presence, respectively, of a properly installed seal.

13 Claims, 2 Drawing Sheets

FLUID INTERFACE

BACKGROUND OF THE INVENTION

1. Field of the Invention

The present invention relates to the interface between two members having fluid conduits therein to establish a substantially fluid-tight connection between the conduits. In particular, the present invention relates to the interface between two fluid conduits, each opening to a surface of a member intended to be joined, surface to surface, to the other member with the openings in registration wherein a resilient seal, such as an O-ring or the like, is resilient received between the surfaces, usually in a counterbore surrounding one of the openings. More particularly the present invention relates to an interface of the type described wherein means are provided allowing accurate testing for a missing and/or inoperative seal.

2. Description of the Prior Art

It is well known to utilize members which are mounted or assembled together in a surface-to-surface relationship with an interface establishing substantially fluid-tight fluid communication between fluid conduits defined in each of the members. Such conduits often are part of a pneumatic or hydraulic control or actuation system (see, for example, U.S. Pat. No.5,231,895; 5,222,404; RE 34,260; 4,678,017 and 4,877,048, the disclosures of which are incorporated herein by reference).

Typically, such interfaces involve a first surface having a conduit opening which is urged toward a second conduit having a registering conduit opening. A resilient seal member, such as an O-ring or the like, is usually resiliently deformably received between the surfaces. A countersunk or counterbore portion is provided for receiving the O-ring. In the final assembly, the O-ring is not visible and, thus, missing or damaged seals cannot be visibly detected without disassembly.

The quality of the various fluid interfaces is often tested by forcing pressurized fluid or air through the various conduits and looking for leaks. By way of example, a well-known method involves coating the interface in a soapy solution or immersing the interface in water, forcing pressurized air through the conduit system and looking for bubbles.

A drawback with the prior art fluid interfaces was that when the members were new and/or initially assembled, the surfaces would create a temporarily fluid-tight connection, even in the absence of the seal, which made detection of missing or inoperative seals difficult or impossible. Subsequently, as the assembled members were subject to wear, vibration and the like, the missing and/or damaged seals caused the fluid interfaces to become less effective and/or to fail.

SUMMARY OF THE INVENTION

In accordance with the present invention, the drawbacks of the prior art are overcome or minimized by the provision of a fluid interface which will allow positive leak testing for missing or ineffective seals by the traditionally used fluid circuit testing techniques. The foregoing is accomplished by providing a test passage leading from one of the openings to the exterior of the assembled members, the test passage being blocked by a properly installed seal member but allowing detectable fluid communication between the interface and the exterior in the absence of a properly installed seal member. Preferably, the test passage will be a relatively small cross-section passage which communicates with the countersunk or counterbore area provided to receive the resilient seal member.

Accordingly, it is an object of the present invention to provide a new and improved fluid interface which allows positive testing for missing and/or ineffective seals.

This and other objects and advantages of the present invention will become apparent from a reading of the detailed description of the preferred embodiment taken in connection with the drawings.

DESCRIPTION OF THE PREFERRED EMBODIMENT

Figures 1, 2, 3:
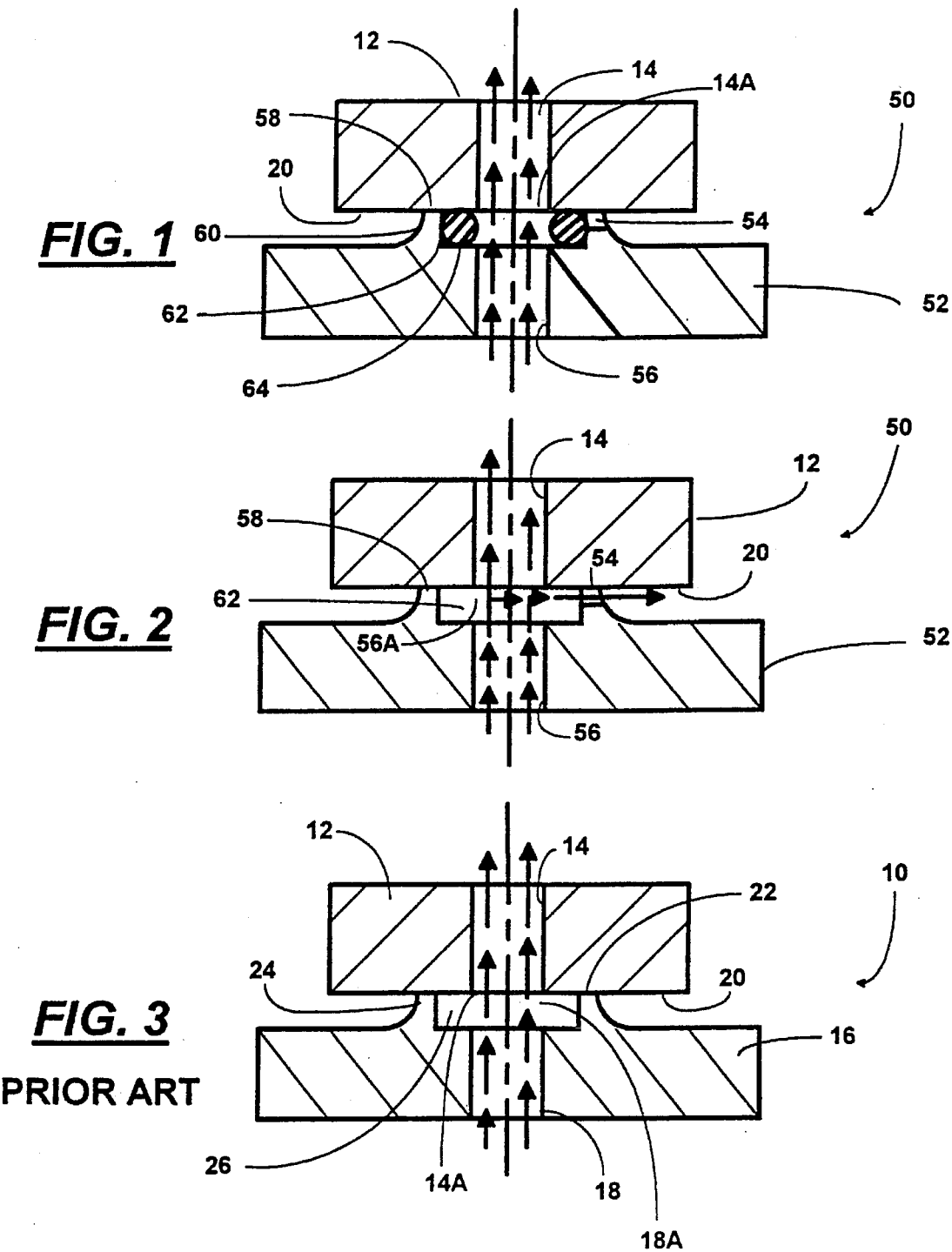
FIG. 1 is a sectional view of the present invention with the seal member present and properly installed.
FIG. 2 is a sectional view of the fluid interface of the present invention with the seal member absent.
FIG. 3 is a sectional view of a prior art fluid interface with the seal member absent.

A typical prior art fluid interface 10, with the resilient seal (typically an O-ring or the like) missing, may be seen by reference to FIG. 3. By way of example, a solenoid valve housing 12 defining a fluid conduit 14 may be removably assembled to a transmission shift actuator housing 16 defining a fluid conduit 18 whereby actuators, such as piston chambers or the like, communicating with conduit 18 may be selectively pressurized or exhausted by valves, causing conduit 14 to be selectively connected to a source of pressurized fluid, such as hydraulic fluid or pressurized air, or to an exhaust or sump. Other examples of fluid interfaces are well known in the prior art.

Conduit 14 opens to the lower surface 20 of member 12 and conduit 18 opens to the upper surface 22 of a raised boss 24 formed in member 16. A counterbore or countersunk 26 is formed in boss 24 surrounding the opening 18A of conduit 18 for receipt of a resilient seal member, such as an O-ring or the like, intended to be resiliently deformed between members 12 and 16 to create a substantially fluid-tight communication between conduits 14 and 18 under conditions of wear, vibration and the like. Clamping means (not shown), such as threaded fasteners, are utilized to urge surfaces 20 and 22 into compressive contact with opening 18A of conduit 18 in register with opening 14A of conduit 14.

As may be seen, when the members 12 and 16 are assembled, the cavity for receipt of the seal is not visible from the exterior of members 12 and 14, and it may not be visually determined if the seal is present and properly installed.

A problem with prior art fluid interface 10 is that when members 12 and 16 are initially assembled, surfaces 20 and 22 may initially seal sufficiently so that in a leak test of the circuit including conduits 14 and 18, the pressurized test fluid (symbolically represented by arrows) will not leak. Thus, while such an interface will pass an initial leak test, under conditions of use, wear and/or vibration, the absence of the seal member will cause the interface to become less effective and/or to fail.

Figure 4:
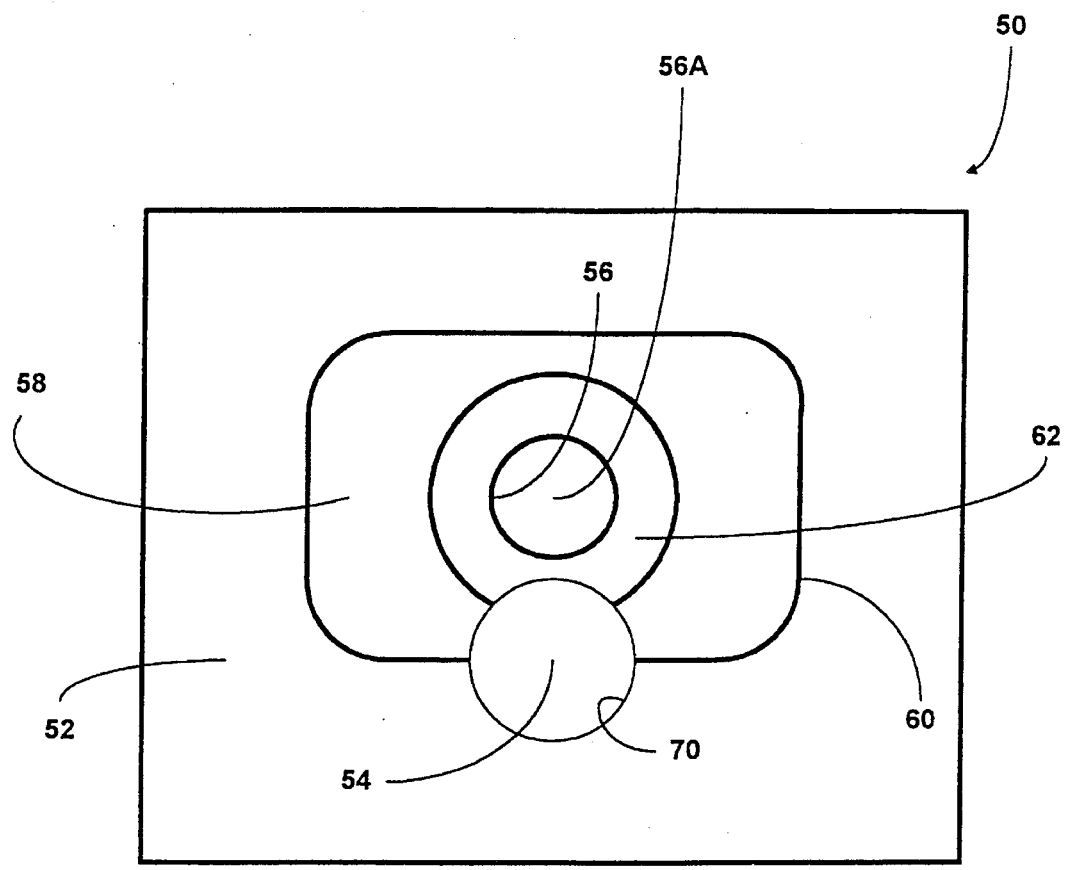
FIG. 4 is a top view of one member of the fluid interface of the present invention.

The improved fluid interface 50 of the present invention is illustrated in FIGS. 1, 2 and 4. In interface 50, member 12 identical to member 12 described above in connection with interface 10, defines a lower surface 20 having an opening 14A of fluid conduit 14. Member 12 is assembled to a member 52 substantially identical to member 16, except for the presence of a test passage 54 (to be described in detail below).

As with member 16, member 52 defines a fluid conduit 56 having an opening 56A at the upper surface 58 of a raised boss 60 defined by member 52. Members 12 and 52 are assembled with the surfaces 20 and 58 urged into contact with openings 14A and 56A in register. A countersunk bore 62 is provided for receiving a resilient seal, such as O-ring 64.

Referring to FIG. 1, when member 12 is assembled to member 52 with the seal 64 properly installed, seal 64 in cooperation with surface 20 will seal passage 54 from fluid communication with conduits 14 and 56. Referring to FIG. 2, when member 12 is assembled to member 52 with seal 64 missing, passage 54 will communicate conduits 14 and 56 with the exterior of the members, regardless of how tightly surfaces 20 and 58 are in contact. Accordingly (see FIG. 2), a missing or ineffective seal may be detected by traditional leak test methods.

Referring to FIG. 4, it may be seen that a relatively shallow counterbore 70 in surface 62 overlapping counterbore 26 may be utilized to provide the test passage 54. Preferably, passage 54 will have an effective cross-sectional area considerably smaller than the effective cross-sectional areas of conduits 14 and 56.

Although the present invention has been described with a certain degree of particularity, it is understood that various modifications are possible without departing from the spirit and the scope of the invention as hereinafter claimed.

We claim:

1. A fluid coupling for two members assembled in surface-to-surface contact, comprising a first fluid conduit defined in the first member and having a first opening at a first exterior surface defined on said first member, a second fluid conduit defined in the second member and having a second opening at a second exterior surface defined on said second member, said members adapted to be attached in first-surface-to-second-surface contact with said openings in register, and a resilient seal member adapted to be resiliently deformably received between said members in registration with said openings to provide a sustaining, substantially fluid-tight seal between said conduits, and a test passage extending from one of said openings to an outer surface of one of said members, said first: and second exterior surfaces being flat adjacent said first and second openings and, other than for said passage, urged into sealing contact about said registered openings, said passage sealed by said seal member and allowing limited fluid flow between said openings and said outer surface in the absence of said seal member whereby the presence or absence of fluid flow through said passage to said exterior is indicative of the absence or presence, respectively, of said seal member.

2. The coupling of claim 1 wherein one of said exterior surfaces defines a counterbore cavity in register with said openings for receipt of said seal, the cavity being hidden from exterior view when said members are attached in said surface-to-surface contact.

3. The coupling of claim 2 wherein said test passage opens to said cavity.

4. The coupling of claim 2 wherein said seal member is an annular ring.

5. The coupling of claim 4 wherein said test passage opens to said cavity.

6. The coupling of claim 4 wherein said passage has an average cross-sectional area less than 50 percent of the average cross-sectional area of said first and second openings.

7. The coupling of claim 4 wherein said passage has an average cross-sectional area less than 25 percent of the average cross-sectional area of said first and second openings.

8. The coupling of claim 1 wherein said passage has an average cross-sectional area less than 50 percent of the average cross-sectional area of said first and second openings.

9. The coupling of claim 1 wherein said passage has an average cross-sectional area less than 25 percent of the average cross-sectional area of said first and second openings.

10. An interface between a first fluid conduit defined in a first relatively non-deformable member and a second fluid conduit defined in a second relatively non-deformable member, said first conduit opening to a first surface defined by said first member, said second conduit opening to a second surface defined by said second member, said first surface intended to contact said second surface with said first and second conduit openings in registration, a relatively resilient annular seal received in resilient deformation between said surfaces in a counterbore in one of said members in register with said opening to provide sustained, fluid-tight communication between said first and second conduits, and a test passage extending from said counterbore to an exterior surface of said one of said members, said first and second surfaces intended for sealing contact, other than for said passage about the outer periphery of said counterbore, and said passage blocked by said seal and providing fluid communication between said openings and the exterior surface in the absence of said seal.

11. The interface of claim 10 wherein said seal is an annular ring.

12. The coupling of claim 10 wherein said passage has an average cross-sectional area less than 50 percent of the average cross-sectional area of said first and second openings.

13. The coupling of claim 10 wherein said passage has an average cross-sectional area less than 25 percent of the average cross-sectional area of said first and second openings.

* * * * *